US012743909B2

(12) United States Patent
Everly et al.

(10) Patent No.: US 12,743,909 B2
(45) Date of Patent: Sep. 22, 2026

(54) OPTIMIZING USE OF BATTERY ELECTRIC MINE VEHICLES BASED ON SIMULATIONS

(71) Applicant: Modular Mining Systems, Inc., Tucson, AZ (US)

(72) Inventors: Kyle Everly, Tucson, AZ (US); Josiah Pohl, Tucson, AZ (US); Akshay Chowdu, Tucson, AZ (US); Christopher Utter, Tucson, AZ (US)

(73) Assignee: MODULAR MINING SYSTEMS, INC., Tucson, AZ (US)

( * ) Notice: Subject to any disclaimer, the term of this patent is extended or adjusted under 35 U.S.C. 154(b) by 0 days.

(21) Appl. No.: 18/743,006

(22) Filed: Jun. 13, 2024

(65) Prior Publication Data

US 2024/0420518 A1 Dec. 19, 2024

Related U.S. Application Data

(60) Provisional application No. 63/507,943, filed on Jun. 13, 2023.

(51) Int. Cl.

| | |
|---|---|
| ***G08G 1/16*** | (2006.01) |
| ***G07C 5/00*** | (2006.01) |
| ***G07C 5/08*** | (2006.01) |
| ***G08G 5/80*** | (2025.01) |
| ***G08G 7/02*** | (2006.01) |
| *E21C 41/26* | (2006.01) |

(52) U.S. Cl.
CPC ........... *G07C 5/008* (2013.01); *G07C 5/0808* (2013.01); *E21C 41/26* (2013.01)

(58) Field of Classification Search
CPC ........ G07C 5/008; G07C 5/0808; E21C 41/26
See application file for complete search history.

(56) References Cited

U.S. PATENT DOCUMENTS

| | | | | |
|---|---|---|---|---|
| 2016/0314421 | A1* | 10/2016 | Watkins | G06Q 10/06313 |
| 2022/0291691 | A1 | 9/2022 | Utter et al. | |
| 2024/0308361 | A1* | 9/2024 | James | B60L 50/60 |
| 2024/0378571 | A1* | 11/2024 | Sait | G01C 21/3453 |

FOREIGN PATENT DOCUMENTS

| | | | | |
|---|---|---|---|---|
| CA | 3229285 A1 * | 3/2023 | | B65G 67/04 |
| WO | 2023279135 A1 | 1/2023 | | |
| WO | WO-2024120613 A1 * | 6/2024 | | B60L 5/00 |
| WO | WO-2025106088 A1 * | 5/2025 | | B60L 50/53 |

* cited by examiner

*Primary Examiner* — Anne Marie Antonucci
*Assistant Examiner* — Jingli Wang
(74) *Attorney, Agent, or Firm* — Quarles & Brady LLP

(57) ABSTRACT

A method and computing environment for mine productivity simulation and optimization is disclosed. Mine vehicle work efficiency is determined and stored in a mine vehicle model. A mine geographical layout is imported, and an operational mine model is used to simulate the movement of vehicles and material in the mine. The simulation yields a computation of mine output as a function of energy input to the mine machines. Mine configuration parameters may then be adjusted in the simulation, and real-world mines reconfigured, to meet performance targets.

15 Claims, 10 Drawing Sheets

OPTIMIZING USE OF BATTERY ELECTRIC MINE VEHICLES BASED ON SIMULATIONS

CROSS REFERENCE TO RELATED APPLICATIONS

This application claims priority to U.S. Provisional Patent Application No. 63,507,943, entitled Optimizing Use of Battery Electric Mine Vehicles Based on Simulations, filed on Jun. 13, 2023, the entirety of which is incorporated by reference in its entirety.

FIELD OF THE INVENTION

This disclosure is related to systems and methods for simulating the performance of battery electric and other mine vehicles in a mine environment, and for optimizing the guidance and destination assignments for such vehicles based on such simulations.

BACKGROUND

Mining environments, particularly open pit surface mining environments, rely on scores of power-intensive machines and vehicles for operation. The workhorse of a modern surface mine is a mine haul truck, which is a dump truck capable of hauling up to four hundred, and in some cases over four hundred, tons of material. Haul trucks are some of the largest land vehicles ever built, and have immense energy consumption requirements. Additionally, within a mining environment there may be many other vehicles such as shovels, dozers, bucket wheel excavators, or other equipment, which also have enormous power requirements. Conventionally, most of these pieces of equipment are powered by diesel-electric systems. For example, most modern haul-trucks are diesel-powered. Other pieces of equipment are purely electric, and are powered by electrified trolley lines, or through electrical draglines that source power from a diesel generator or a mine electrical microgrid.

Over the past three decades, truck-shovel systems (systems based on a power shovel working at an ore face, and a fleet of haul trucks to transport ore from the shovel to a crusher) have been the preferred method of haulage for open pit mining due to their relative flexibility and productivity in comparison to other haulage systems. As near-surface deposits have been depleted, average ore grades have declined and stripping ratios have increased. Accordingly, there has been a push to improve productivity of existing haulage fleets from different perspectives. This need for improvements is only super-charged considering that haulage costs can often account for 50-60% of the total cost of mining at an operation. A small efficiency improvement in the haulage system can cumulate over time and bolster the operation's bottom line.

Thus far, the mining industry has responded to these challenges by increasing truck and shovel sizes, introducing Fleet Management Systems with sophisticated tracking systems and dynamic assignments, better maintenance schedules to reduce downtimes, and overall maintaining a high level of equipment utilization.

With the advent of more efficient and cost-effective hub motors, electrical storage batteries, and management systems, new opportunities exist for battery-electric mine vehicles and equipment. Battery Electric Vehicles (BEVs) potentially offer increased energy efficiency for open-pit load & haul operations. Additionally, the introduction of mine BEVs would permit mine operations to reduce carbon emissions, which is increasingly an important goal. Electrifying a mine's fleet, however, presents a unique set of operational challenges. Battery-electric vehicles may have reduced carrying capacity because of battery weight. Additionally, Battery-electric vehicles must be charged, which requires down time that cuts into productivity.

Additionally, wholesale rapid replacement of diesel or diesel-electric vehicles and shovels with BEVs is impracticable as the existing stock of legacy vehicles represents a huge capital investment and existing vehicles have long service lifetimes. This means that the industry can anticipate a long period during which the mine environment will be a hybrid environment using both BEVs and legacy vehicles. A system and method for optimizing mine production in such a hybrid environment would be highly advantageous.

SUMMARY OF THE INVENTION

Embodiments of the invention are directed to systems and methods for optimizing production in a mine environment using both BEVs and legacy Diesel-electric and other legacy vehicles. According to one embodiment, a model is constructed enabling simulation of mine operations, including the loading and unloading of mine haul trucks. The model includes or receives vehicle models, which are models reflecting performance parameters of one or more types of mine vehicles, such as haul trucks. The vehicle models may be used to simulate the performance and power efficiency of simulated haul trucks within the mining environment, under a variety of operating conditions, primarily work rate, which is a function of speed, elevation change and weight. The model also includes geographic information reflecting a mine layout, including a road network and a plurality of vehicle destination points. The vehicle destination points may include shovels, crushers, dumps, electrified trolleys, maintenance bays and refueling/recharging stations. The model also includes a number of rules sets usable to simulate the movement of simulated trucks within the mine model. The rule sets include dispatch rules, refueling/recharging rules, maintenance rules and contention rules. One function of rule sets is to set conditions that government the ability of vehicles to move on the defined road network within the mine.

A mine model constructed according to inventive embodiments may be used to simulate movement of vehicles in a mine and thereby provide an estimate of mine productivity. This estimate may be used to optimize mine parameters such as the mix of different types of vehicles, different dispatching rulesets, and the location of electrified trolleys.

In other embodiments, the invention includes a method of optimizing a mine configuration. The method includes the steps of receiving a plurality of vehicle models each model reflecting performance characteristics of a vehicles, the plurality of vehicle models including at least one battery electric vehicle. The method also includes receiving a geographical model of a mine layout, the geographical model including a road network, one or more electrical trolley lines and a plurality of vehicle destination points. The method also includes applying a plurality of vehicle movement rules governing the movement of vehicles within a mine and simulating movement of a plurality modeled vehicles in a mine in accordance with the vehicle movement rules. On the basis of the simulated movement, the method includes computing a mine output parameter. The inputs may then be adjusted and the variance in the mine output parameter tracked in order to find optimal mixes of input parameters.

In one embodiment, a computer-based method for mine configuration optimization is provided. The method includes the steps of receiving a plurality of vehicle models, where each model reflecting performance characteristics of a vehicles. The plurality of vehicle models including at least one battery electric vehicle. The method also includes receiving a geographical model of a mine layout, the geographical model including data representing a road network, one or more electrical trolley lines and a plurality of vehicle destination points. The method also includes receiving a plurality of vehicle movement rules governing the movement of vehicles within a mine. According to the method, a mine operation model is used to simulate mine operations, including the movement of vehicles and equipment such as haul trucks within a mine. The mine operation model includes a plurality of mine configuration parameters. The mine operation model simulates the movement of material and vehicles in the mine, and uses the vehicle models to compute energy use and input energy required by the modeled vehicles, so as to predict a mine efficiency value as a function of various mine configuration parameters, including vehicle mix, road layout, and placement of trolley lines and refueling stations.

In some embodiments, the mine operation model may iteratively simulate the movement of material and a plurality modeled vehicles using the geographical model of the mine, in accordance with the vehicle movement rules, each of the plurality of modeled vehicles being reflected in the plurality of vehicle models, then on the basis of the simulated movement over a predetermined timeframe, compute a mine output parameter. Then, a mine configuration parameter may be altered, and the simulation process repeated to gauge the effect on mine productivity. On the basis of the computation of mine output parameters, a mine manager may optimize various mine configurations to maximize production, or in favor of some other goal, like a mix of production and low emissions. In certain cases, the physical mine layout or configuration is altered as a result of this optimization process. This may include changing the location of trolleys, changing the mix of battery versus diesel vehicles, rearranging fueling/recharging stations, etc.

Systems and methods according to inventive embodiments have certain advantages. Modeling and optimizing mine operation according to the inventive methods may allow operators to maintain high levels of production as BEVs are phased into use and diesel-electric vehicles are phased out.

Additionally, the modeling tools described herein may be used to lower operating costs by permitting scheduling of different types of vehicles depending on fuel and energy costs, which may periodically fluctuate. Additionally, inventive embodiments may allow operators to optimize on variables other than production (or to optimize on variable in addition to production). One such variable may be carbon emissions. One modem problem, at the forefront for operations worldwide, has been the commitment to reduce greenhouse gases (GHGs), with the biggest source being the operators' haulage fleet. Mechanical improvements, fleet automation, and better maintenance have incrementally increased fuel efficiency over time, but the next step-change is expected to emerge from the adoption of a fully electric haulage system. This has meant investment in battery-electric trucks and assessing their viability in maintaining current productivity levels at operations. Adoption of battery-electric vehicles (BEVs) presents operations with new challenges such as balancing charge-discharge cycles, maintaining high equipment utilization, and managing battery lifecycles. These considerations further complicate the already complex haulage systems at operations and consequently, a mine operation simulation model is an advantageous way to study these interactions to make better decisions regarding fleet sizing, capacity, makeup, and feasibility of production goals.

BRIEF DESCRIPTION OF THE DRAWINGS

The drawings described herein constitute part of this specification and include example embodiments of the present invention which may be embodied in various forms.

DETAILED DESCRIPTION

Figure 1:
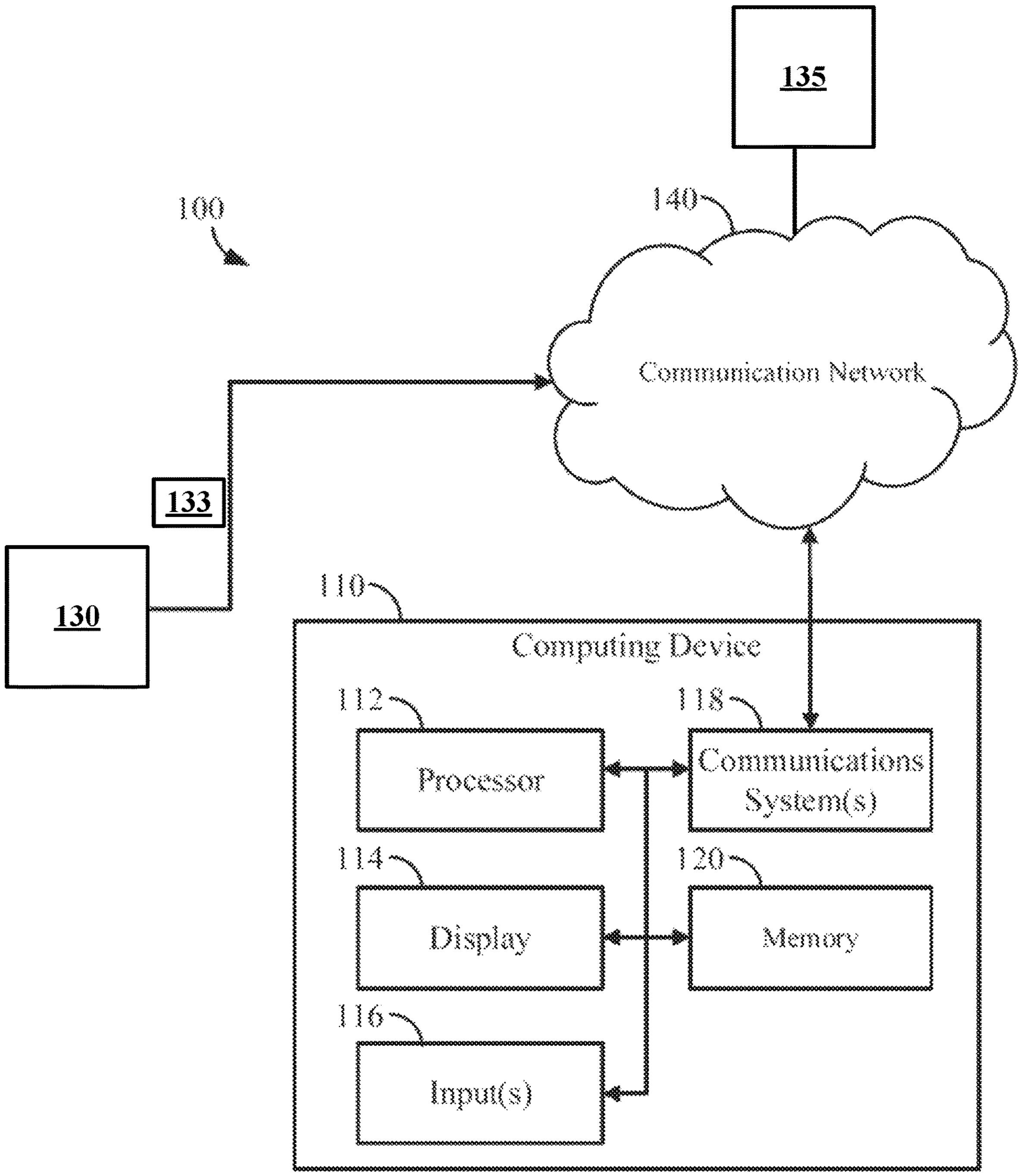
FIG. 1 depicts a computing environment in which methods according to the invention may be practiced.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

The methods described herein may be carried out in an actual or simulated mine environment in conjunction with processes being executed in computing environments, such as the one 100 illustrated in FIG. 1. The computing devices (e.g., 110) that may carry out the inventive methods described below will generally include the features of computing devices such as one or more programmable microprocessors (112), volatile and/or non-volatile memory (120), input devices (116) such as keyboards, microphones and pointing devices, and output devices (e.g., 114) such as visual displays and speakers. The method steps described below may be implemented on such computing devices, and specifically, the computing devices may have programmable processors in electronic communication with non-volatile storage, which may have computer readable instructions encoded thereon that are executable by the processor to carry out the described method steps.

The computing devices on which the described systems are implemented preferably have wired and/or wireless network interface circuits configured to allow the device to receive data from and send data to other computing devices (e.g., 130, 135) over a communications network 140. Communications network 140 may be wired or wireless. Information accessed by computing device 110 over the communications network 140 may include data objects including data about vehicles, vehicle configurations, mine layouts, and the like. In certain cases, the mine simulations described below take data on parameters like vehicle condition (e.g., vehicle speed, location, destination, weight), vehicle type, geographical data regarding mine layouts, vehicle activity such as travel between waypoints, and mine productivity from sensors and/or other computing devices within a mine environment. For example, a computing device hosting a mine model and running optimization routines as described may receive data (133) from computing devices located at vehicles (130) or directly from sensors at the vehicles, which data may include information about the speed of the vehicle, its weight, time varying location, fuel level and battery data such as voltage, temperature and charge state.

Computing devices may receive data geographically representing a mine environment, including data representing a road network, the locations of charging/refuel stations, shovels, crushers and service bays. Such data may originate with a mine management computing device 135, tasked with real-time scheduling of the movement of vehicles and other equipment in the mining environment. The road network data may comprise data reflecting individual road segments, each of which may have certain properties encoded in the road network data. For example, the road network data may be a data structure that includes sub-structures, each corresponding to a road segment. Each road segment structure may have a data record with data representing: endpoints of the segment, the identities of intersecting road segments, segment length, speed limits or other rules governing speed, rules including or disallowing certain vehicle types, slope, segment condition, hazard conditions and the presence of a trolley line. Geographic mine data may be received from a mine vehicle scheduling and management system including its own computing device. Such a system serves to supply task assignments to mine haul trucks, and otherwise control the movement of vehicles and material within the mine environment.

Computing devices implementing the methods described below may also receive data from sensors or other computing devices, which data is reflective of mine output. For example, computing devices implementing methods according to the invention may receive data from crushers, indicating the amount of material being processed on a real-time basis.

Computing devices implementing the methods described below may also receive data from internal and external sources regarding electricity usage. For example, computing devices may receive data from sensors or from an electric utility supplying a mine environment regarding instantaneous and time-averaged electricity usage by the mine and/or rate information. Similar data may be received from internal electrical power generation or storage facilities, like generators or solar installations. Additionally, computing devices implementing the methods described below may receive data from charging stations indicating the presence or absence of vehicles, electricity output, and battery charge state and voltage.

Thus, while the initial part of this disclosure describes various modeling methodologies for mine productivity as a function of various parameters relating to the use of BEV and conventional haul trucks, the person of ordinary skill will appreciate that this modeling and optimization methodology may be extended to provide real-time mine management. It is contemplated that the data used for modeling that is described immediately below may be collected from a mine environment in real time, a model constructive, predictions made on the basis of the model, and then adjustments can be made to mine operation in real time to optimize on figures on merit such as production, energy cost, emissions targets, or combinations of the above. The adjustments may include changing the mix of vehicles in use (BEV versus convention diesel electric) and changes to vehicle routing may be ordered and revised missions sent to vehicle operators. The second and third portions of this disclosure illustrate two exemplary concrete applications of the modeling methodology first described.

In this disclosure, a system and method are presented for modeling the effects of electrification on productivity at real operations using a Discrete Event Simulator. The model can simulate multiple shifts, a mixed fleet of diesel and electric trucks, charging and refueling stations, trolley systems, and accurate shovel-truck loading cycles. These simulations enable a determination of the trade-offs of adopting electric fleets and how they interact with the layout of today's mines. Additionally, the data and conclusions drawn from these simulations are usable to optimize mine configuration and vehicle scheduling as a function of mine layout and the mix of conventional vehicles versus BEVs.

In certain embodiments, a simulation tool is used to create a discrete event simulation of real-world mine operations, with the purpose of better understanding the impact of replacing conventional trucks with BEVs. The effect of BEVs on mining operations is then examined as well as the changes wrought by adapting mining infrastructure to better suit BEV technology.

Figure 2:
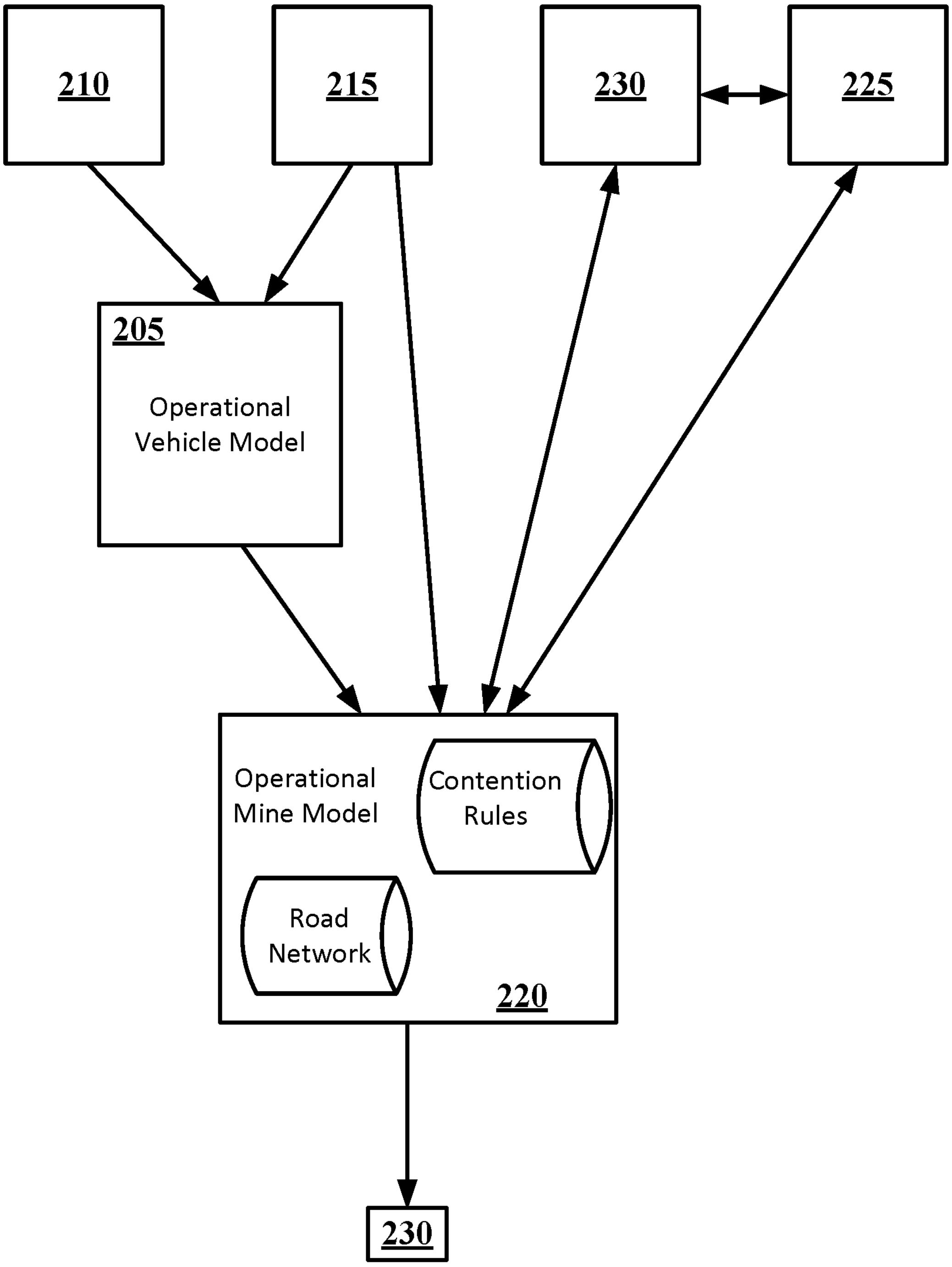
FIG. 2 conceptually depicts computer processes usable for carrying out a method according to the invention.

FIG. 2 illustrates a conceptual arrangement for computational tasks and the flow of data objects in accordance with a first embodiment. In the arrangement of FIG. 2, the illustrated blocks are processes running on one or more computing devices and/or data objects stored in one or more databases.

In a first embodiment, a system for mine optimization includes the step of building and/or receiving a high-level simulation module (operational vehicle model 205) of one or more vehicles, including BEVs. Preferably, there is one operational vehicle module for each vehicle and/or other piece of equipment operating in or available to operate in a mine. Preferably, the vehicle simulation model specifies the work done by vehicle types being modeled as a function of operational parameters including load weight, load distribution, distance, speed, elevation changes, specialized tasks such as digging, loading and swinging (in the case of shovels), and dumping (in the case of haul trucks) and other parameters relevant to power consumption. Vehicle power plant efficiency and charge/energy or fuel use as a function of work under the aforementioned operational parameters is also included in the model. The operational vehicle model may also include a base energy consumption figure for each vehicle to reflect idling time when the vehicle is doing no work in terms of haulage, but it still consuming energy.

It is contemplated that the vehicle models 205 may be constructed with data from or sourced directly from data stores maintained by vehicle manufacturers 210 that have access to vehicle design and performance data. Third party manufacturers may have data on the rate of fuel/energy use as a function of work rate, power expenditure, etc., that may be sourced for construction of the vehicle models.

Additionally, the vehicle models 205 may also associate fuel and charge/energy with cost parameters (e.g., cost per unit electric energy or cost per volume of fuel), so as to construct a price per unit work parameter for each vehicle under a variety of operating conditions. These cost parameters may be sourced from third party data stores 215, for example, energy or fuel costing information sourced from connected electrical utilities or fuel vendors. The energy cost parameters may be updated in the models in real-time from data reflecting real-time changes in the cost of energy sources (e.g., changes in the cost of utility supplied power over the course of the day). In alternative embodiments (also illustrated through FIG. 2), energy cost data may be included in the operational mine model 220 (described below).

The preferred output of the operational vehicle model is a measure of the operational efficiency of the modeled vehicle. This may be expressed as a measure of energy expended in terms of work done by the vehicle (energy) as a function of energy consumed by the vehicle (in terms of fuel volume or electrical energy provided to the vehicle). When energy costs are included in the vehicle model, it may additionally or alternative output work energy per unit cost of input energy.

The system of FIG. 2 also includes a mine operational model 220, which is constructed for modeling power use by a plurality of vehicles corresponding to the vehicle models described above. The mine operational model uses performance and layout data from an existing mine site and simulates the haulage operation of a mixed fleet of diesel and battery electric trucks and other vehicles or equipment such as shovels. These vehicles and equipment are modeled as data objects within the operational mine model 220, and their performance parameters are imported from the operational vehicle model 205 on the basis of, for example, vehicle type. The operational mine model 205 model steps forward in time, using data objects that represent mine trucks and shovels in operation. These mine assets interact with each other in load and dump events that are analogous in time and affect to real life mining activity.

The mine operational model 205 includes a road network model. The road network model of the mine specifies the available paths or path segments that trucks are allowed to travel within the simulation. Each path has a travel time associated with it along with a corresponding fuel consumption, which may be calculated from path parameters (e.g., elevation over distance, curve radius, surface roughness, expected traffic conflicts, etc.), vehicle operational parameters (e.g., speed) and vehicle performance parameters (e.g., work efficiency) pulled from the vehicle model. Fundamentally, the attributes of paths or segments within the road network model are used to compute the energy expenditure cost (e.g., work) expended by a vehicle as it traverses the path segment under specified load conditions and at specified speeds. Using this energy cost for traveling along a path segment, by a particular vehicle at a particular speed, combined with the information in the operational vehicle model 205, the operational mine model computes the energy input to the vehicle needed (and consumed) by a particular vehicle traveling that path under the specified conditions. The model 205 also computes the energy input to the vehicle needed by the vehicle during idle time.

The road network received in the mine operational model is specific to the layout of the given mine and is preferably generated from data pulled from actual mine installations. These road networks are defined as data objects in a road network database. Road network data may be updated in real time as road networks within a mine environment being modeled change. Alternatively, new road networks, not yet actually in use at a mine site, may be defined in the road network database and evaluated using the mine operational model.

In order for the operational model to be capable of making accurate energy consumption predictions, it must model the manner of travel of a collection of vehicles together. This requires additional considerations. To enhance accuracy, the mine operational model also includes a mine-specific contention rule set that mediates contention among vehicles. The contention ruleset defines specific turn-taking to ensure that trucks being modeled are not occupying the same space as one another within the simulation.

Referring still to the mine operational model, trucks within the model may be specified according to one or more truck operational parameters. These may include current position, remaining fuel or charge, and maintenance schedule. Other parameters may be included in data objects specifying trucks, such as velocity, current load, tire condition, or other parameters relevant to fuel/power consumption. For each mine being modeled, data is received and loaded into the truck data objects that corresponds to actual trucks in use in the fleet at the mine being modeled. For each mine, we use the data we know about their fleet to set these parameters. As the trucks accomplish tasks throughout the mine, fuel/power is used and various performance metrics around the mine are computed as a function of truck activity (e.g., the rate of ore being transported, processed, etc.). The fuel consumption, size of yield from load and hauls missions along with the time it takes to complete said missions are all configurable within the model to be customized to match different mining operations.

The mine operational model includes additional data objects corresponding to worksites, waypoints, hazards and obstructions, charging stations, trolley lines, maintenance bays, refueling stations and other points of significant. Within the model, shovels are stationed within the mine at the active dig sites. The shovels may have certain operational parameters associated with the shovels in a data object such as capacity, bucket status (full, empty, bucket position, bucket velocity), as well as scheduled maintenance and fuel or charge levels. During processing of the model, the shovel's loading of a truck positioned at a load positioned is modeled. During the load event, trucks are positioned at a shovel until the loading is completed, with truck queues occurring when a shovel has multiple trucks at the location. In certain embodiments, rules are applied that specify that when trucks complete dump missions, and they do not need to go into a refuel and maintenance bay for service, they are dispatched to the shovel with the fewest trucks currently queued.

In a preferred embodiment, the operation of a mine modeled in the mine operational model as set forth above is simulated by applying a set of operational rules to truck behavior. An example rule set includes contention rules, dispatch rules, maintenance rules, and refueling rules. Contention rules govern which truck will proceed in the event of contention (e.g., the truck on its way to a dump or the truck on its way to a shovel having the shortest queue has right of way). Dispatch rules govern a truck's next destination or "mission" (e.g., loaded trucks go to dump, after unloading, truck goes to the shovel with shortest queue). Maintenance rules set conditions under which a truck reports to a maintenance bay (e.g., every 500 miles, every 10 days, when certain truck sensor conditions indicate, etc.). Refueling rules set conditions under which a truck reports to refueling station (e.g., whenever fuel tank reaches 0.X full, where X is variable by the party running the simulation). Typically, maintenance and refueling rules will be checked and applied under certain conditions, e.g., when a truck is empty or when a truck has just unloaded. In certain embodiments, the mine operational model may include random maintenance events distributed to trucks to model random breakdowns. The frequency of such events may be determined from historic data, or may be part of the truck models received from truck manufacturers. Maintenance and refueling events may be associated with variable down-times, which preferably are determined from historical real-world data.

Using the mine operational model as set forth above, an embodying method is usable to compute some figure of merit 230 as a function of energy input to the trucks or other vehicles. Typically, the output figure of merit 230 will be mine material output, measured, for example, by the amount of ore moved to a dump or crusher over time. Other output parameters of interest may also be modeled and predicted such as fuel use, fuel cost, or output as a function of both or either of these parameters. Thus, instead of computing mine output or mine output per input joule, the model 220 can output mine output per energy dollar, relying on real time energy pricing information received from external sources 215. Multiple output parameters may be specified and computed, and these multiple parameters may be individually weighted and combined to result in combined figure of merit. For example, output per unit energy and total output could each be weighted and the results summed. Total greenhouse gas emissions could be output (based on emissions per unit output energy from operational vehicle model 205), and that figure could be weighted and combined with the output efficiency value in some manner, resulting in a combined figure of merit that accounts for both mine output and emissions.

In different embodiments, the model is run over variable time scales, but in a preferred embodiment, the model is run over the course of a month, which has been found to be a good amount of time where any transient artifacts are overcome by the steady state operation. Upon completion of the simulated time specified, the model produces detailed output of the simulation, capturing the load and haul missions as well as any other activities such as maintenance and refuel of the trucks and shovels.

Referring back to FIG. 2, the road network model may be imported into the operational mine model 205 from a road network database 225. That database may be maintained by a mine management process 230 being run on a mine management computing device in communication with a computing device running the operational mine model over a communications network. A mine management process will typically be run at an operating mine, where it governs the scheduling and movement of vehicles within the mine. The mine management process 230 is in communication with its road network database 225, which contains information on roads and segments within the mine, as well work faces, shovels, crushers, service bays, refueling and recharge stations, and the like. While the discussion thus far has centered on modeling the performance of hypothetical and actual mine environments by simulating the movement of vehicles within the model, in alternative arrangements, the operational mine model 220 can take information on real time, actual mine operations from the mine management process 230. This information may include geographic information pulled from the road network database 225 reflecting the actual road network in place at the mine being managed. With a real-world road network, real world data on the types of trucks actually in operation at the mine, real-time vehicle routing data, and a prospective vehicle movement schedule (all of which are accessible through the mine management process), the operational mine model 220 can track output as a function of input energy in real-time. Operational mine model 220 can also generate look-ahead predicts of energy use and output on the basis of vehicle routing schedules generated by the mine management process 230 over pre-defined time windows (e.g., next hour, next shift, next 24 hours). Operational mine model may provide feedback to the mine management process to optimize schedules or other parameters on the basis of the output figures of merits. For example, the operational mine model may provide suggestions on the use of different types of vehicles on certain routes, it may suggest scheduling adjustments at certain times of day depending on hourly movement in energy costs. The operational mine model 220 may also suggest altering the mix of battery electric and diesel electric vehicles in use depending on, for example, the cost or availability of energy sources. These concepts are further disclosed below in reference to FIG. 3.

According to an embodying method, operation of a mine set is modeled, as set forth above, and its output over some time interval is predicted. For a conventional mine that uses diesel-electric haul trucks and other diesel or diesel-electric vehicles and machines, the output of this simulation can be used as a baseline indication of current productivity prior to the integration of one or more BEVs. Additional simulations over the same time period can then be run while incorporating BEVs into the model as substitutions for diesel-electric trucks to compare the operation of hybrid mine environments with the diesel-electric baseline. Additionally, the methodology discussed below may be used to optimize the number of operating BEVs in a hybrid environment as parameters like the cost of fuel and electricity are varied.

To compare the performance of BEVs to conventional vehicles, operational models of BEVs are included in the vehicle and operational mine model described above. As is set forth above, the operational characteristics (e.g., load capacity, battery capacity, efficiency under various load, speed, environmental and vehicle temperature and driving conditions) of BEVs may be generated and stored as a vehicle model based on data received from a BEV manufacturer or data measured by a system user. Additionally, the operational mine model is altered to include BEV infrastructure, chiefly, charging and power infrastructure such as electrified trolley lines ("trolleys") and charging stations. These pieces of infrastructure are associated with data objects listing operational performance (e.g., charge transfer rate). Data surrounding performance of these technologies is relatively sparse due to their lack of deployed time, but data were sourced from electric vehicle engineers allowing the Applicants to estimate data for power consumption, truck haulage capacity, and charging rates from charging stations and trolley charging. These parameters were stored in data objects accessible by the model.

To approximate trolley usage, in one embodiment, segments the road network are given trolley charging capabilities that would charge the Battery Electric Vehicles as well as increase slower truck's speed. Preferably, the model subjects these trolleys to random maintenance events to predict how intermittent availability of trolleys would impact overall performance of the mine. With the addition of electricity as a power source, the mine operational model may be configured to output metrics power usage across the whole mine. These energy usage metrics can be presented as a function of cost (which may vary over time) and they may be converted to emissions metrics which mining leaders across the industry are trying their best to reduce.

Details regarding how the model is configured to estimate electricity usage by BEVs will now be described. To simulate BEV power consumption, an estimation of how much energy each movement of a vehicle consumes is created. The estimation methodology uses conservation of energy theory and applies to each road segment. The total energy consumed is made up from:

1) the energy required to move the truck the horizontal distance of the road segment,
2) the energy required to lift the truck and load to the end elevation,
3) the energy returned by the braking regeneration system,
4) the energy returned from charging on a trolley if present.

The total sum is negative when energy is returned to the battery.

$$E_{Removed\ from\ Battery} = E_{Horizontal\ Travel} + E_{Gravitational\ Potential} - E_{Regen} - E_{Trolley}$$

Each term was calculated as follows.

$$E_{Horizontal\ Travel} = \frac{C_{Rolling\ Resistance}\, mgd}{C_{Drivetrain\ Efficiency}}$$

Vehicle specific parameters such as m (mass of vehicle plus load) and drivetrain efficiency are retrieved from the vehicle model. The coefficient of rolling resistance may be measured from real world data or estimated. The coefficient of rolling resistance may also vary with road segment, reflecting the fact that certain road segments are rougher/smoother than others. In one embodiment, the coefficient of rolling resistance was assumed to be 0.02 and the drivetrain efficiency was assumed to be 0.8. The term g is gravitational acceleration, 9.8 m/s$^2$. The term m is the gross weight of the vehicle, and d is the length of the segment.

$$E_{Gravitational\ Potential} = \frac{mgh}{C_{Drivetrain\ Efficiency}}$$

Where h is the change in elevation. This term is zero if the truck went downhill.

$$E_{Regen} = C_{RegenEfficiency}\, mgh$$

The efficiency of regenerative braking is typically sourced from the BEV manufacture and included in the vehicle model accessed by the operational model. In one embodiment, the efficiency of the regeneration system was assumed to be 65%. This term is set to 0 for flat or uphill travel.

$$E_{Trolley} = tr$$

Where t is the time the truck spent on the trolley line and r is the power of the trolley. The trucks were assumed to immediately connect and disconnect from the trolley when entering and exiting the road, and were assumed to travel at a constant rate of 15 mph. The trolley charging is typically assumed to be 100% efficient, but this parameter may be varied in the model to reflect real-world data.

For each road segment in the model the energy used by a vehicle traversing the segment under loaded or unloaded conditions is calculated. To validate the estimation, several routes were designed to mimic likely routes in the actual mine being modeled. The energy used for the loaded forward and unloaded return travel was estimated. These values were compared to theoretical fuel use values and estimated real world fuel use.

In certain embodiments, the theoretical fuel use of diesel-electric vehicles is computed on the basis of vehicle parameters (e.g., manufactured supplied estimates of fuel efficiency) and operational parameters (speed, acceleration, elevation change, etc.). The theoretical fuel use was calculated by a third party who was given the same routes and used a time step simulation with Rimpull curves/tables to calculate acceleration, speed, and distance. This simulation resulted in two numbers, total fuel used, and total retard used. To give a more reasonable comparison, the retard was subtracted from the fuel energy used to calculated net energy used, because Battery Electric trucks can recapture retarder energy, as opposed to diesel trucks which have to dump it across a bank of resistors.

To validate the model, the estimated real world fuel used was generated from results of another project which sought to calculate current fuel by tracking historical fuel usage in a mine. For each segment a fuel burn rate was collected and using these, an estimated real work fuel burn was calculated for each route.

TABLE 1

Estimated battery energy used validation comparison

| Profiles | | Modular | | Komatsu | | Historical Fuel Estimation | |
|---|---|---|---|---|---|---|---|
| | | Net | | Net* | Fuel | Fuel | Efficiency |
| ID | NIEF | kWh | Fraction | eqv kWh | gal | gal | gal/mile |
| P1 | 100.0 | 763 | 0.41 | 1879 | 51.9 | 42.2 | 5.98 |
| P2 | 94.7 | 488 | 0.39 | 1245 | 34.2 | 28.0 | 6.03 |
| P3 | 96.7 | 1104 | 0.42 | 2649 | 74.0 | 56.8 | 5.81 |
| P4 | 7.1 | 871 | 0.36 | 2442 | 72.7 | 72.1 | 4.88 |
| P5 | 70.7 | 491 | 0.37 | 1334 | 44.9 | 75.8 | 6.46 |

*In this case net means the energy usually lost to the retarder was subtracted from the fuel energy.

Non-Incidental Elevation Fraction (NIEF): Value gives the percent of the elevation change that was part of the net elevation gain. Effectively, a lower number means more undulation in the road. A value of 100 means there was no downhill sections on the uphill route.

It will be appreciated that with the mine operational model described above, a user may undertake a variety of evaluation and optimization tasks. In the simplest case, a user can simulate mine output under various mixes of conventional diesel-electric and BEVs. A user may also vary mine parameters, such as the locations of fueling stations, recharge stations, and trolley lines, to determine optimum arrangements of such infrastructure, where the figure of merit on which optimization is being performed is productivity. A user may also optimize by trading off productivity against other quantities such as emissions reductions or the cost of energy. By way of example, it may be desirable to run more BEVs at night, to avoid peak utility demand charges, and more legacy vehicles in the day, when electricity supplied by the utility is more expensive. A user of the model may generate a 3-D output space where productivity is on one axis and total energy cost (for both fuel and electricity) is on another axis, and where time is on a third axis, and find global optimization points. Other sorts of optimization and analysis are possible, some of which will now be described.

Model Running and Analysis:

The models described above are usable to understand how mine performance changes within various scenarios. These scenarios are exemplary, but are presented here to demonstrate the value of optimization technologies for decisions that apply specifically to BEHT (battery electric haul truck) operations. Exemplary specific decisions may include:

1. Dispatch: how should trucks be routed, considering BEHT-specific operational considerations?
2. Layout: where should trolleys be placed to maximize their usage and benefit operations?

For each of these scenarios the model is usable to predict the impact on productivity as a function of BEV technology saturation (i.e., number of BEVs and amount and distribution of charging/power infrastructure). In an example analysis, diesel trucks are replaced with BEHT in increments of 20%. At each increment, the operation is simulated with alternative layouts to assess the impact on the productivity of the mine site.

Initial Results

The model was run on two mines at increasing fractions of battery electric trucks in the fleet. The results are shown at FIGS. 3 and 4.

Tons-kilometers was chosen as the key performance indicator (KPI) to represent production. Tons-kilometers is calculated by multiplying the load carried, in tons, by the distance traveled, in kilometers. This metric has an advantage over simply tracking the total amount of material moved because changes in fleet dispatching and composition can cause material to be moved to different sinks, meaning the same amount of material moved in one situation may not be as productive as the same amount of material moved another. In the same way to tracking total tonnage moved, the return empty trips do not contribute to the KPI sum.

Figure 3:
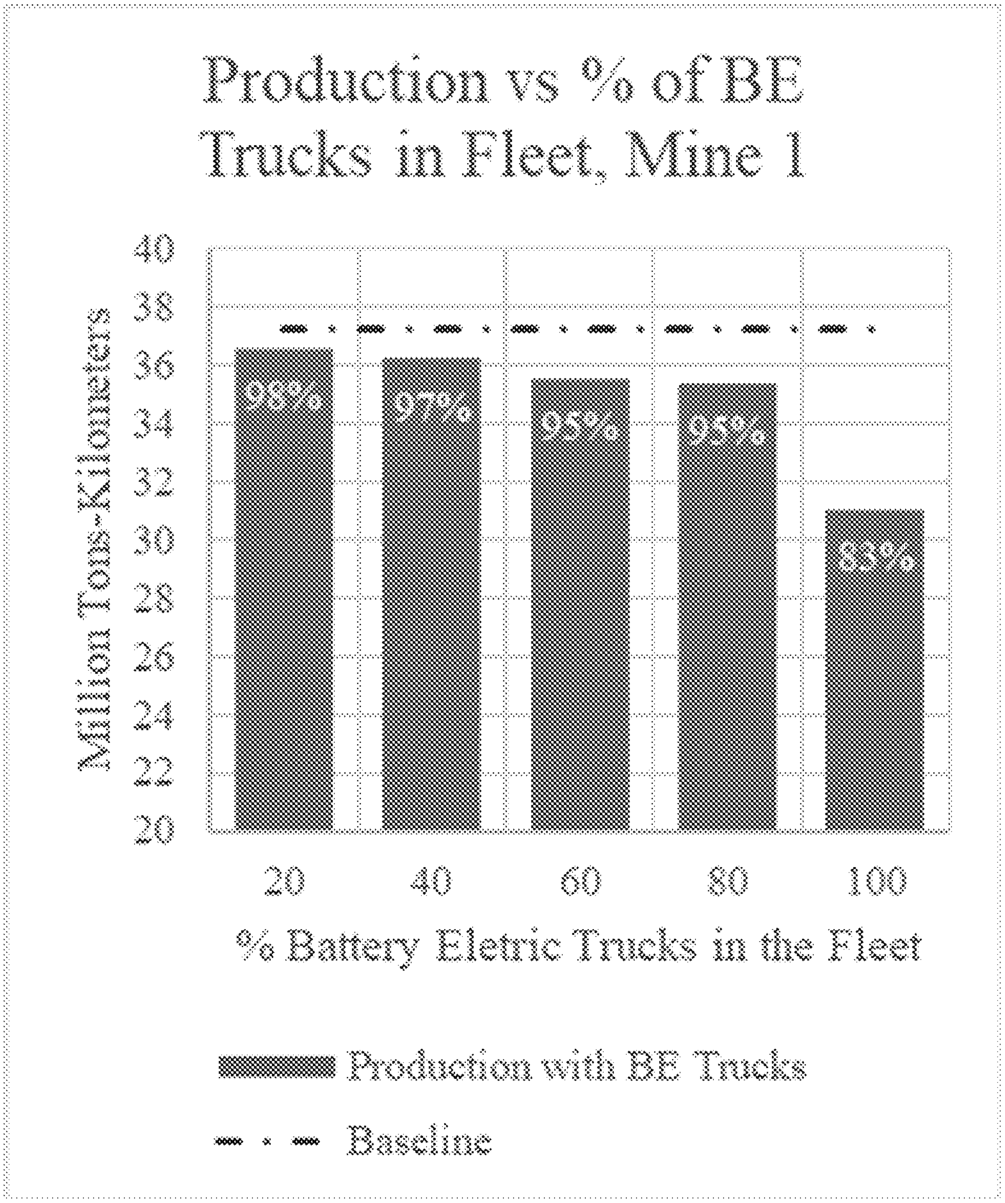
FIGS. 3 and 4 show output results from a modeling and mine optimization method according to an inventive embodiment.
Figure 4:
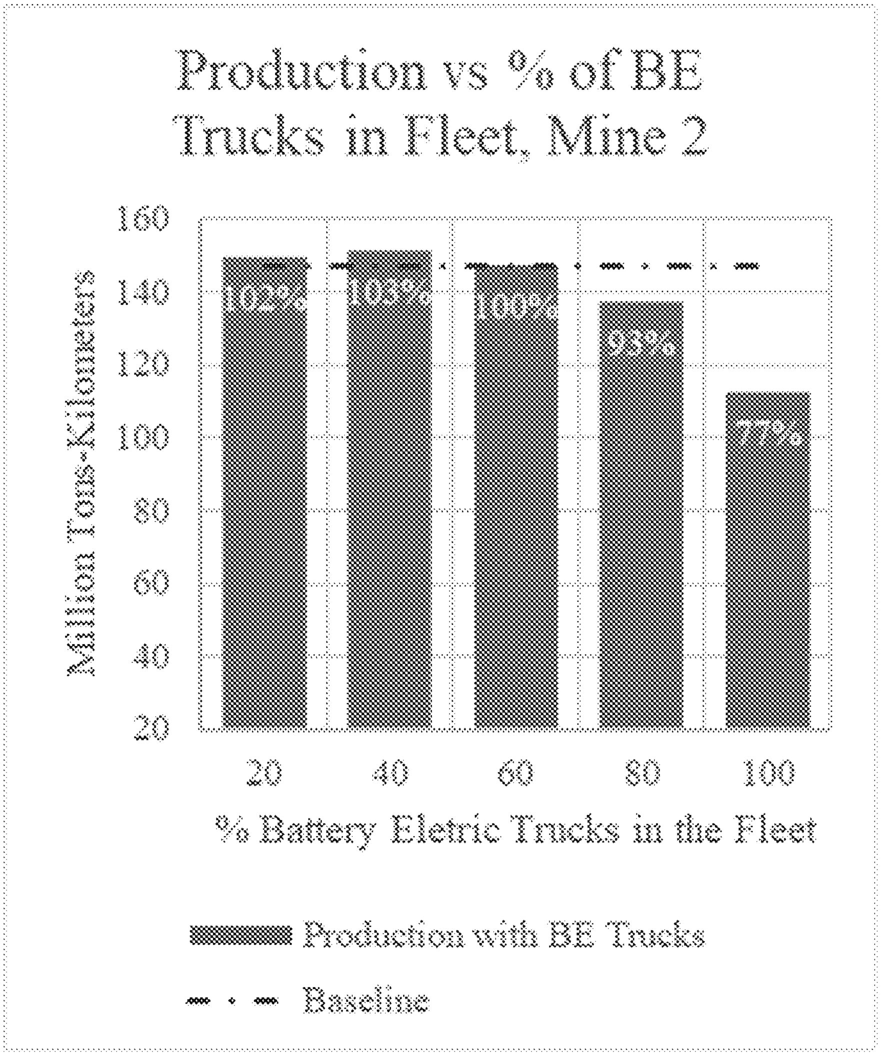

The initial results reflected in FIGS. 3 and 4 show the advantages and drawbacks specific to using battery electric trucks in a mine fleet, and specifically, that the optimal mix of trucks will vary considerably with mine configuration (i.e., the road network and the location of elevations of shovels, crushers and dumps). In mine 1, production with a mixed fleet saw an impact that was gradual, but immediately negative. Generally, with fleets consisting of 50% or less battery electric trucks production saw minimal losses (around 97% of baseline production). However, past this point production began to drop and at 100% production dropped severely. Watching the simulations and analyzing truck time category data indicated the same issue. During most shifts some battery electric trucks would run out of charge. Per the rules of the model, each truck that runs of out charge must park for the rest of the shift, mimicking the downtime associated with towing a discharged haul truck on the mine road and recharging it. Most simulations had at least a few trucks fully discharge, presumably causing the slight dip in mine 1 production, and simulations with large battery electric fleets saw many more complete discharges leading to the large loss of production.

Mine 2 was set up differently and saw more encouraging results. Mine 2 is much larger than mine 1, both terms of number of trucks and in geographic footprint. To allow for successful simulations, the battery capacity of the BE trucks in mine 2 was doubled. While this capacity is not realistic with current technology, it was illuminating to see the effects, notably, that production increased slightly with small fractions of battery electric trucks in the fleet. Doubtless the larger batteries helped cut down on complete discharging delays. In addition, it is also thought that the baseline was under-trucked, allowing more efficient trucks to increase production measurably.

Even with larger batteries mine 2 still had significant impacts to production at 100% battery electric fleets. It is thought that certain tasks, such as dumps far away from the trolley system, are better suited to diesel trucks and forcing battery electric trucks to pursue these leads to complete battery depletion and the subsequent production loss.

It is notable that increasing the battery capacity seems to give the trucks the required buffer to work efficiently with the trolleys. From an energy balance point of view, as long as the trolleys are able to provide the trucks with slightly more energy than is needed for a round trip, the set up can run without trucks having to stop for stationary charging. However, variance in routes and conditions require trucks to have a sizable buffer to avoid completely depleting their charge. With the current projected battery capacity margins are thin. For example, a battery only has enough energy to lift the truck and load out of the pit twice, and this is before considering and travel or efficiency loses. Compare that with a diesel truck which can manage an entire shift of work before needing a refuel. For the time being, carful routing and assignment is advantageous to manage BE trucks.

It will be appreciated from the results above, that the model predicts that BEVs may be substituted for conventional vehicles with minimal productivity roll off until the percent of BEVs reaches a relatively high level, and that this roll off can be mitigated with careful routing decisions. The person of ordinary skill will also recognize that additional KPIs may be tracked and used to select an optimum mix of BEVs and conventional vehicles. Specifically, it is contemplated that cost of operation data may be folded into the output of the model to create a KPI that reflects tons moved per operating dollar, for example. This figure of merit may vary with time (e.g., with time of day), and so different vehicle mixes may be selected as function of fuel cost as well as tons of material moved. Additionally, optimization may be performed on the location of charging stations and trolleys.

Dispatching/Refueling/Charging Algorithm Comparison

Figure 5:
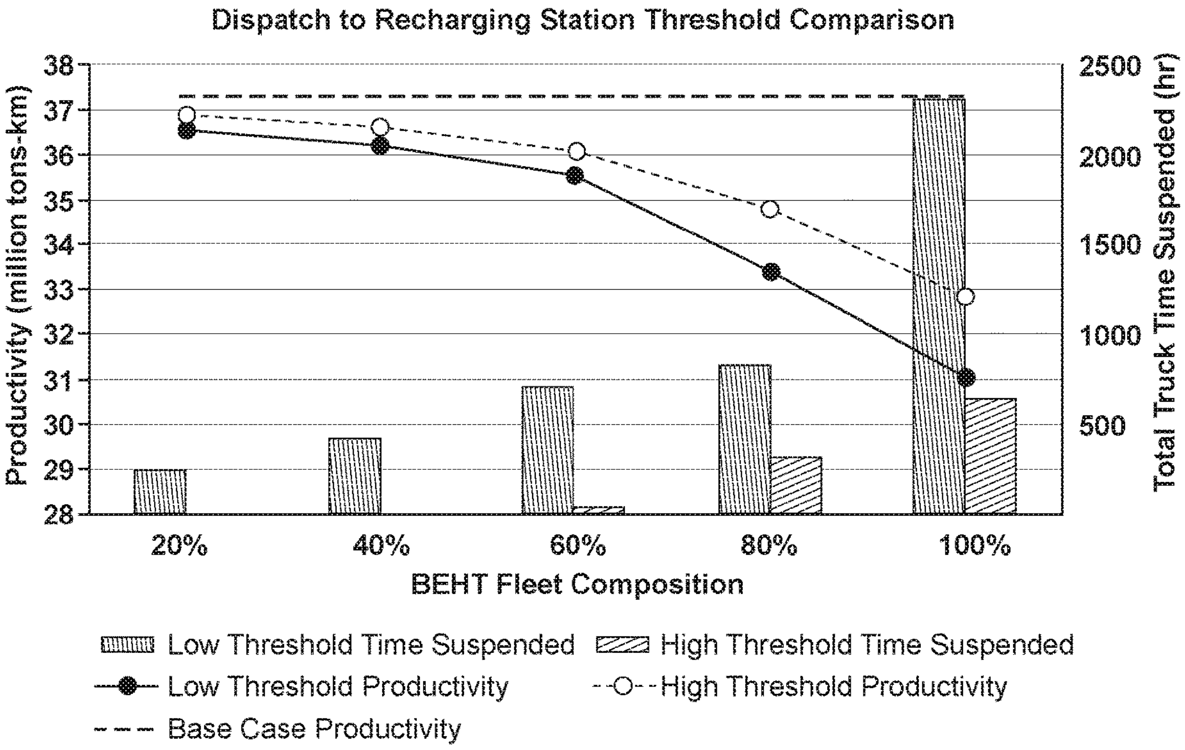
FIG. 5 shows simulated mine productivity as a function of refuel threshold time and proportion of battery electric vehicles.

FIG. 5 shows the overall mine production in 5 BEV penetration scenarios subject to two different dispatching strategies. In one case, the BEHT's are dispatched to the next load or dump location when at least 20% of the charge is remaining. In another case, the BEHT's are dispatched to a nearby charging facility once their remaining charge goes below 40%. The higher charging threshold reduces the risk of running out of charge during the next assignment but imposes an additional delay of charging time to more BEHT's. The results show the scenarios with greater delay time but lower risk of running out of charge perform better. The modeling arrangement of FIG. 2 may be used to generate better recharge rules based on expected power use than the 20%/40% heuristic modeled for FIG. 5. Using the modeling methodology described with respect to FIG. 2, individualized predictions of expected power use for particular vehicles can be generated on the basis of the vehicle operational models and expected paths of travel required by missions assigned to that vehicle. This enables modifications to be made to scheduling of charging missions that enable BEHTs to finish their next assignment while maintaining an optimal battery charge level using the most efficient charging method. Such predictive algorithms are expected to outperform and overcome the limits of that rule-based approach shown in the example result of FIG. 5.

Trolley Configuration Analysis

As is seen in FIG. 5, dispatching strategies have a clear effect on production, and the modeling method set forth above provides an effective tool to test and optimize on dispatching strategies. The models described herein also support optimizing on charging infrastructure such as trolley configuration. To explore this, a mine was selected and nine sections of roads where trolleys could reasonably be installed were identified and labeled (see FIG. 6 and Table 2).

TABLE 2

| Candidate trolley road sections and their properties Trolley System | Length (ft) | Elevation Gain (ft) | Avg Grade |
|---|---|---|---|
| A | 6064 | 506 | 8.3 |
| B | 3028 | 266 | 8.8 |
| C | 1732 | 172 | 10.0 |
| D | 7379 | 178 | 2.4 |
| E | 4273 | 135 | 3.2 |
| F | 3123 | 8 | 0.3 |
| G | 2939 | 117 | 4.0 |
| H | 2639 | 40 | 1.5 |
| I | 4343 | 251 | 5.8 |

Figure 6:
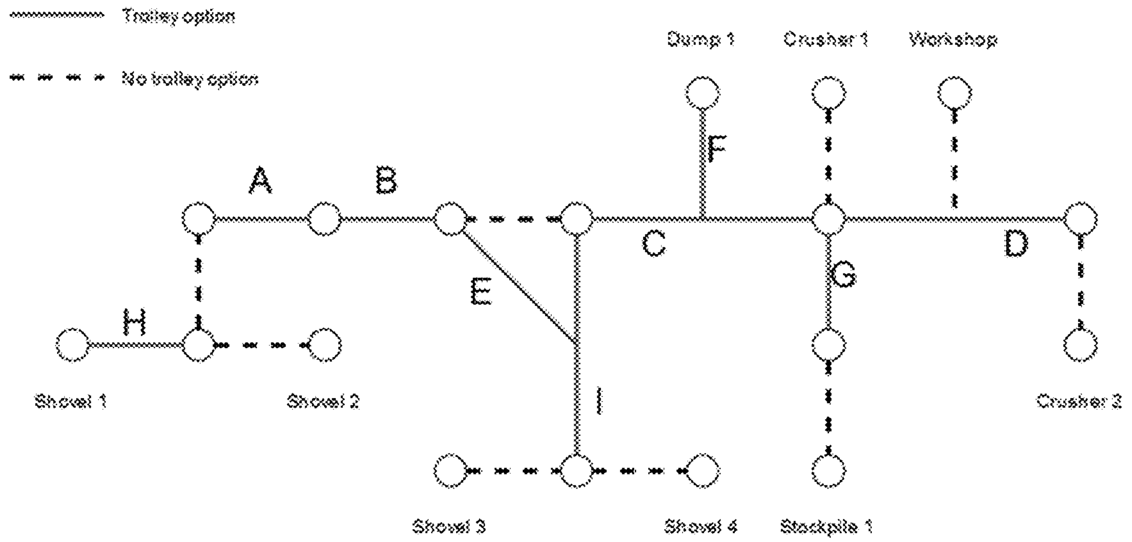
FIG. 6 conceptually illustrates geographic mine data usable in an inventive mine optimization system.

Configurations were created by selecting candidate roads to get a trolley. Several configurations were created manually and another 11 were created randomly to try to eliminate any unforeseen bias. Each candidate road was required to have at least one pairing with every other candidate road. In total 14 configurations were designed. The abstracted road system for Mine 1 with road segments that could include a trolley is shown at FIG. 6. Table 3, below, shows the various trolley configurations tested in the road network of FIG. 6. Table 4, below, shows the power options for each trolley tested. Specifically, for each configuration three power levels were run (all trolleys at the same power). For each trolley power level, 5 BE fleet combinations were simulated, bringing the total number of unique simulations well past 200.

TABLE 3

| Mine trolley configurations Test Name | No. of Trolleys | Trolley Length (miles) | Layout |
|---|---|---|---|
| Random 5 | 5 | 4.43 | ADGHI |
| Random 4 | 4 | 3.47 | ACDF |
| Random 11 | 4 | 3.34 | AEGI |
| Evens | 4 | 3.30 | DEFH |
| Random 10 | 4 | 3.11 | BCDE |
| All pit | 4 | 2.86 | ABCE |
| Peripherals | 3 | 2.80 | DGI |
| Random 9 | 4 | 2.47 | FGHI |
| Random 6 | 2 | 2.21 | DE |
| Random 2 | 3 | 2.21 | BEI |
| Steeps | 3 | 2.05 | ABC |
| Random 1 | 3 | 1.90 | EFH |
| Random 3 | 3 | 1.46 | BCG |
| Random 8 | 2 | 1.07 | BH |
| Random 7 | 2 | 0.92 | CF |

TABLE 4

| Trolley system power options Power Options | kW |
|---|---|
| Lower Power | 3000 |
| Medium Power | 6000 |
| High Power | 9000 |

Figure 7:
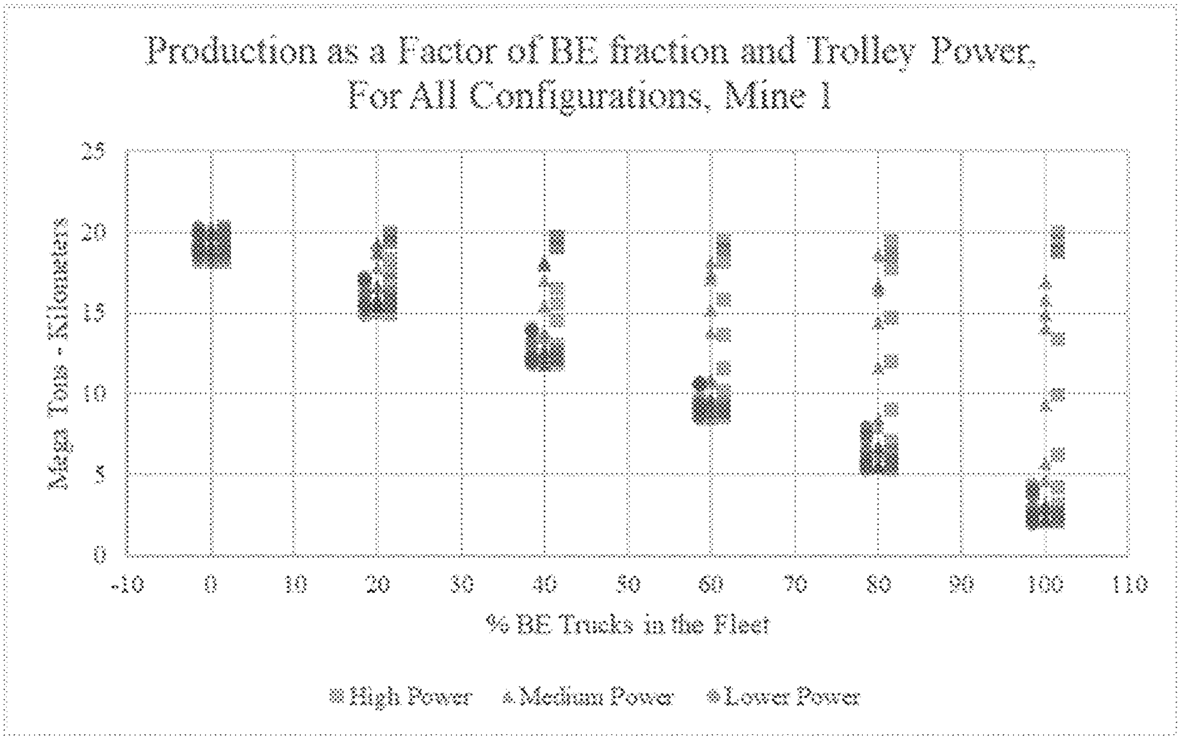
FIG. 7 shows simulated mine productivity as a function of trolley power in a simulated mine environment.
Figure 8:
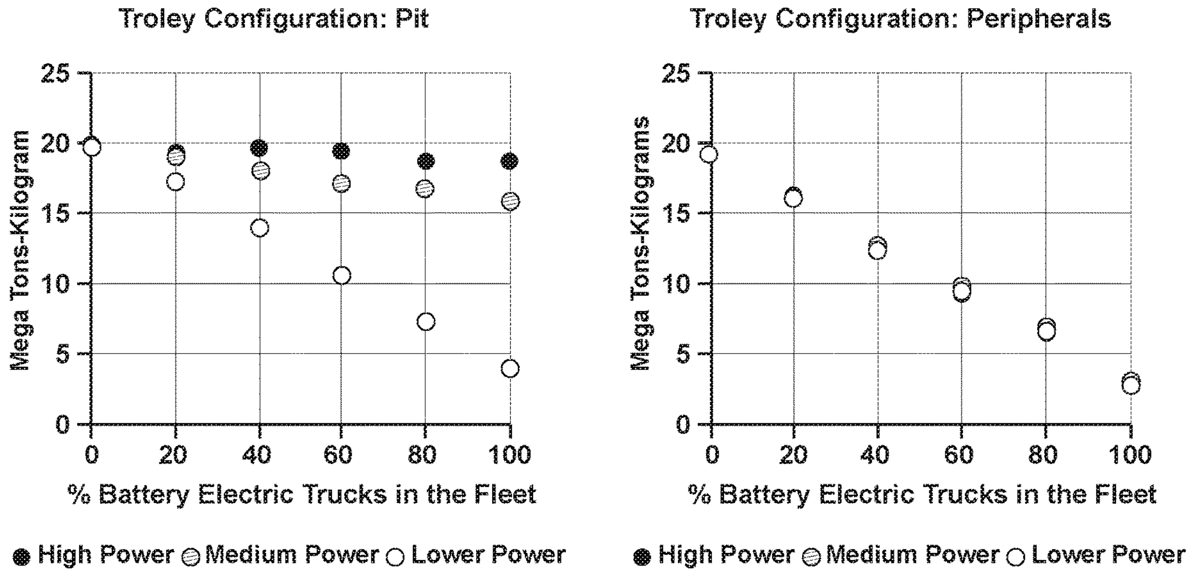
FIG. 8 shows simulated mine productivity as a function of trolley power for various trolley placement configurations.

The results of the simulations discussed above are shown in FIGS. 7 and 8. As can be seen, the results from the initial analysis prompted an investigation into the impact of trolley location and power on the production of the mine. The graph of the combined results (FIG. 7) clearly indicates a strong negative trend for fraction of BE fleet and production. Generally, with more BE trucks there is decreased production. FIG. 8 shows the comparative impact of locating trolleys in the pit portion of a road network (where vehicles will be climbing), versus locating trollers in level areas such as along the periphery of a pit. As the data of FIG. 8 demonstrates, the importance of supplying adequate trolley power is obvious in the "pit" configuration. While the lower power option hemorrhages productivity, the high power and even medium power set ups maintain productivity. However, the simply boosting power cannot make up for poor trolley placement, as can be seen in the "peripherals" configuration. Here, essentially no change in productivity loss is seen with increasing trolley power.

These trends are borne out by the dominance analysis, below, which strongly favors the fraction of battery electric trucks in the fleet. The next largest factor is the presence of trolley system A. It is thought that this indicates the need for good placing of trolleys in the mine. Trolley system A is located on a road segment that is one of the steepest and longest in the modeled mine. In addition, it is on an arterial road, meaning all trucks exiting the pit must travel on it. The analysis suggests that placing trolleys on similar roads is critical to maintaining production. The remaining somewhat significant factors are trolley length, power, and the presence of system C. Length and power are unsurprising factors, while system C is quite similar to system A in its grade and centrality but not as long.

Dominance Analysis The person of ordinary skill will recognize that the models described above may be used to define a multi-variable space in which the relative impact of various variables on mine productivity may be assessed. For the model discussed above, once the simulations were complete a dominance analysis was run on the results to attempt to rank the significance of the factors on production. For each configuration the trolley sections were codified into zeros (no trolley present) and ones (trolley present). Total length of trolley for the whole configuration, the power available on the trolleys, and the fraction of battery electric trucks in the fleet made up the rest of the configurations.

TABLE 5

| Dominance analysis of trolley configurations Term | Interactional Dominance | Percentage Relative Importance |
|---|---|---|
| Percent BE Trucks | 0.6214300 | 73.7 |
| A | 0.0000026 | 8.2 |
| Total Trolley Length | 0.0000149 | 4.7 |
| Power (kW) | 0.0363126 | 4.3 |
| C | 0.0000012 | 3.6 |
| B | 0.0000045 | 1.2 |

TABLE 5-continued

| Dominance analysis of trolley configurations Term | Interactional Dominance | Percentage Relative Importance |
|---|---|---|
| D | 0.0000089 | 1.0 |
| F | 0.0000151 | 0.8 |
| H | 0.0000062 | 0.8 |
| I | 0.0000090 | 0.6 |
| E | 0.0000141 | 0.6 |
| G | 0.0000183 | 0.4 |

The interactional dominance, which can be thought of as the effect of the term in the presence of all the other terms, shows how the effect of each term is amplified by the others. The high value for Percent BE trucks indicates that the strong effect of the term can be tempered with actions of the others. Contrast this with the values of System A and total trolley length which are low, indicating that their effects happen regardless of the system around them. This can be interpreted as saying it's always good to add System A or more trolley length.

Additionally, an interesting observation can be made on the values of the configurations run at 0% BE fraction. In Table 5 it can be seen that there is some variance in production, even when no BE trucks are present. This variance is greater than any randomness in the model and an interesting illustration of one of the limitations of the model. Specifically, every truck on a road with a trolley must travel at the trolley speed of 15 MPH. So, configurations with more length of trolley perform slightly worse in the baseline scenario than configurations with less trolley length.

As is set forth above, the energy inputs required by vehicles operating in a mine environment may be modeled as a function of mine output, and the effect of changes in mine configuration on production efficiency can be predicted. This may be used to optimize real-world mine configurations and to change physical mine configurations to achieve predicted efficiency increases or to meet other goals such as emissions targets or reduced energy costs. Thus, one response to data produced by the model is to change one or more elements of actual mine configuration in response to the computation outcome of the model. For example, the mix of battery electric to diesel electric vehicles may be adjusted, trolley lines relocated or new trolley lines installed in specific locations, etc. Dispatch rules can also be changed. For example, more BEVs may be assigned to specific road segments in the mine to make better use of regenerative braking (e.g., road segments where the vehicle more likely to be loaded on descent than on ascent). Additionally, if electricity cost (which may vary during the course of the day) is incorporated into the mine output parameter, the model may suggest running more BEVs during periods of lower electricity cost. During these times, conventional Diesel-Electric vehicles may my assigned more refueling or maintenance missions such that they are idled a greater percent of the time.

What follows is another example of physical mine configuration changes that can be made in response to the predictive tools described above, specifically, changes to dispatch rules. Conventionally, refueling missions are assigned to vehicles in a mine environment when a vehicle's available fuel/energy reaches some threshold (e.g., 25%). A convention rule governing refueling missions is that a vehicle that has been assigned a refueling mission should proceed to the closest fueling station to its patch of travel. Here, "refueling" and "fuel" should be understood to refer to both diesel and electricity to charge batteries for BEVs, depending on the vehicle. The aforementioned refueling method has a number of disadvantages, which are addressable by method according to inventive embodiments. First, this method does not take account of congestion at fuel stations. Congestion at fuel stations is likely to be high at the beginning and the end of work shifts, and so ideally, refueling missions should be spaced out, particularly during these times, to minimize the time trucks spend idling at fuel stations. Second, depending on the upcoming haulage missions, a vehicle may not need to refuel at the present fuel threshold, and could complete another mission and refuel safely below that threshold. Alternatively, a 25% cushion may not be sufficient given where the vehicle is, particularly if there is a queue at a refueling station. Generally, the goal should be to minimize the number of refueling missions a truck receives and to minimize overall down time of the haulage fleet. Inventive methods are capable of meeting these goals.

In inventive embodiments, refueling missions are scheduled on the basis of look-ahead predictions of fuel use, taking into account congestion at fuel stations. In a first step, the times at which refueling missions will occur for a look ahead period for a plurality of (and preferably all) operating vehicles are predicted. This may be done by predicting the time at which each vehicle reaches a predetermined fuel/energy threshold (e.g., 50%, 40%, 30%, 20%, 10%, or any threshold between those thresholds). The time at which a truck is predicted to reach the predetermined threshold may be based on historical data (e.g., stored, time-stamped fuel sensor readings imported by a mine management process the day before). Preferably, however, the predictions are made by an operational mine model using a vehicle model and a geographical model of the mine road network, according to the disclosure set forth above. In this embodiment, the operational mine model models future movements and load conditions of the truck on the basis of its future dispatch (i.e., assigned destination) missions over the course of some time window. The time window may be some number of hours, an entire day, but preferably is the shift of the operator.

For example, a mine management process will assign a truck a series of missions (collect material at shovel A and deliver to crusher B). This mission, and future missions, are imported into the operational mine model process. The movement of the truck through this mission is modeled, fuel/energy consumption is computed, and future fuel/energy state after the mission is predicted. This process repeats for future expected missions until the system determines the time at which the truck is likely to be below the predetermined threshold, at which point, a refuel mission is likely to be assigned. Movement rules may be applied to fix the time of the likely future refuel mission, for example, refuel missions may be assigned to occur between haul missions, when the truck is unloaded, after a truck has dumped its load, and when it is on its way back to a shovel.

While the process above has been described in terms of receiving a series of expected future haul missions, simulating those missions, and predicting the point in time when fuel/energy state reaches a threshold, the method is not so limited. The refuel time prediction may be dynamically adjusted throughout a time period such that it is more accurate. For example, the mine operations model may receive real-time data from truck sensors, including speed, RPM, weight, and fuel/energy level sensors such that it has access to real-time data about the truck's fuel/energy condition and its current work rate. Additionally, the mine management process can be expected to dynamically reassign or adjust missions. For example, a truck may be assigned to a different shovel when there is a long queue at a previously assigned shovel. These changes are used to update the truck movement simulation in the operational mine model, in real time, so that the next-time-to-refuel prediction can also by dynamically updated.

With future truck movements predicted on the basis of actually scheduled or predicted missions, the system model may predict the fueling/charging station that each truck is likely to use. Generally, this will be determined by a movement rule in place in the mine, that trucks are to use the closest fueling station to their path of travel at the time of the refuel mission. The model also predicts the next time to refuel for each truck, set by the time the model predicts the truck will hit a predetermined fuel/energy level (e.g., 20%, 25%, 50%, etc.). With this information, the system analyzes likely "mid-field" refueling events to predict and minimize congestion and/or contention at refueling stations. This process is conceptually illustrated in FIG. 9.

Figure 9:
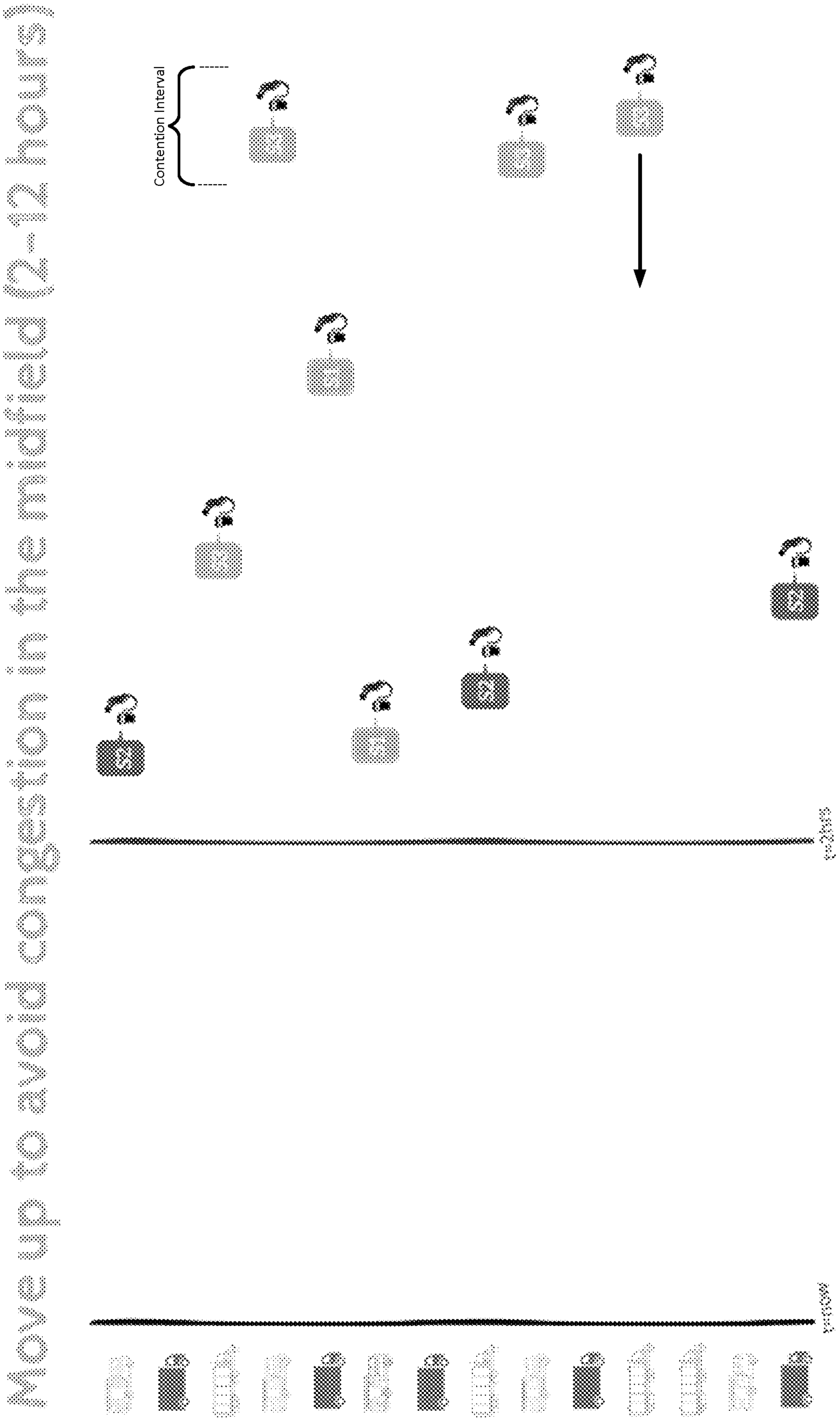
FIG. 9 conceptually illustrates a method for refueling mission adjustment based on simulations according to an embodiment of the invention.

FIG. 9 conceptually illustrates an initial schedule for refuel missions for a plurality of trucks, represented by the truck icons on the left hand side. The initial schedule could be generated by a mine management process, e.g., on the basis of historic data, and initially sent to individual trucks at the start of shift. Preferably, however, the schedule is dynamically generated using the operational mine model, and reflects predictions of when each truck is likely to hit a predetermined fuel/energy level, as was described above. In this latter embodiment, the refuel schedule represents the schedule as it exists and has been generated using the operational mine model at some time, t=0. As can be seen in FIG. 9, at time t=0, a number of trucks are likely to have refuel missions occurring at various times after time t=0. These refuel missions are donated by stations S1, S2, S3, which represent stops at refuel/charge stations in the mine. The x-axis on the chart of FIG. 9 represents time from t=0. The station that each truck is scheduled to visit is determined by its path at the time of the refuel mission, and a truck is being assigned to the closest station off its path.

In the embodiment of FIG. 9, the system examines scheduled, or predicted "mid-field" refueling events. The scope of "mid-field" may vary, but it is preferably sufficiently distance from time 0 such that refueling events in the mid-field are not imminent. In the embodiment illustrated in FIG. 9, "mid-field" events are events occurring at and after a first time, for example, two hours from t=0. Thus, these are not imminent refueling events, and they may be more safely time-shifted without creating a high risk that a truck will run out fuel. Looking at these time-distant mid-field events, the system applies a time contention window to determine whether there is likely to be contention or congestion at a given fueling/charging station. The size of this window may vary (e.g., with diesel versus BEV vehicles, with the size/capacity of the vehicles, with the configuration of the station), but the size of the window will generally be informed by the amount of time it will take a truck to complete recharge/refuel. The contention window is set so as detect refueling events that may cause vehicles to access the station at the same time such that the station capacity is exceeded and trucks become idle. In the example of FIG. 9, for example, the contention window may reveal two trucks scheduled to arrive at S3 within 15 minutes of the first truck such that the S3, at the time of the arrival of the second or third truck, is still occupied. When contention at a station is identified, the system may then move up (closer to t=0) the refueling mission for one or more of the trucks. This is shown by the left-hand arrow in the figure, that has moved up the stop at S3 for one of the trucks in time. The system preferably does not move any refueling mission back in time, since this may risk having a truck run out of fuel. After the mid-field schedule adjustments are performed, the refuel mission schedule is updated and updated schedules are sent to each truck instructing them of the time they are to execute the refuel mission.

Figure 10:
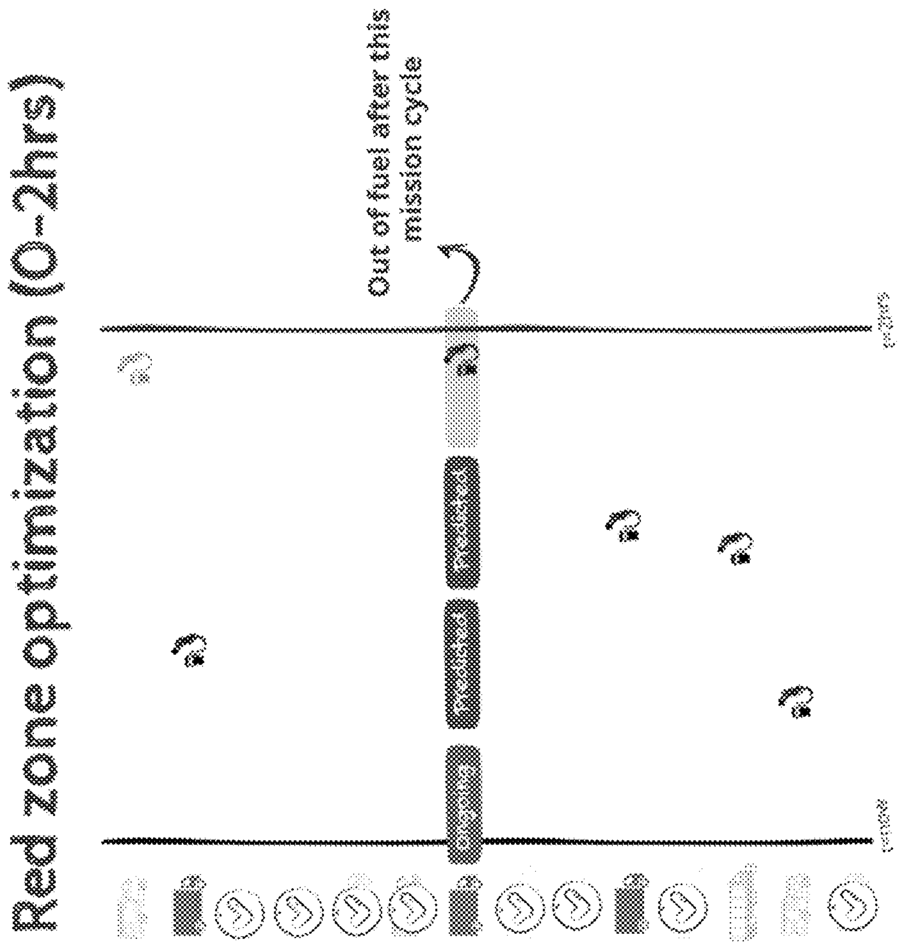
FIG. 10 conceptually illustrates a method for refueling mission optimization within a time-critical window according to an embodiment of the invention.

In preferred embodiments, schedules are further adjusted for closer-in-time refueling events. The foregoing method may be performed, for example, for refueling events occurring within a second time from t=0, e.g, within the next two hours. This may be referred to as the "red zone", since trucks with refueling events scheduled within the next two hours are generally low on fuel (e.g., below 50%, 40%, 30%, 20%, etc.), and so the timing of these missions is critical to prevent these trucks from running out of fuel. For trucks that have entered the "red zone", which will be defined as likely to need fuel within some predetermined time window (e.g., the next two hours), the system performs a particularized predictive calculation of fuel/charge consumption over time according to the modeling methods described above. This is conceptually depicted in FIG. 10, which shows a truck with a scheduling refueling event within two hours. At time t=0, that vehicle is on a current mission. The system uses the operational mine model, vehicle models, geographic mine layout data, and the next assigned missions to model the truck's movement, load conditions, and resultant fuel/energy consumption over the next two hours. On the basis of this predicted fuel usage model, the system determines the time at which the truck is predicted to run out of fuel. It is important to note that performing this modeling and prediction step over a short time frame (i.e., two hours) is likely to yield a more accurate result than a rough calculation of expected fuel usage that might occur at the beginning of shift when refuel missions are initially scheduled. The predicted fuel run out time is compared to the mission schedule and the scheduled refuel mission. In the example of FIG. 10, it is determined that a truck could not complete a fourth mission cycle without running out of fuel, however, there is an appreciable time gap between the completion of its third cycle and its refuel mission. This is inefficient because truck idle time has been built into the schedule.

To maximize efficiency, the system reallocates refuel missions for trucks within the "red-zone", that is for trucks with refuel missions scheduled within a predetermined time band (e.g., two hours) or for trucks predicted to run out of fuel within the predetermined time band. Reallocation comprises moving refuel missions up in time, and rerouting trucks to different refuel stations. For the identified "red zone" trucks, refueling missions are preferably reallocated and rescheduled on the basis of a number of considerations:

- Refuel missions are timed to occur as late as possible for the truck. This maximizes time between refuel missions.
- Stations available for reroute should be as close as possible to the existing scheduled path of the truck.
- Contention/queueing at stations should be avoided.

Thus, the refueling mission optimization system and method above consists of a number of major steps. A system receives a default or initial refueling schedule, the refueling scheduling identifying times a truck should refuel and the stations at which it should refuel. The system then examines refuel missions that are scheduled after a first time (e.g., after two hours, or within the "mid-field"). For those refueling missions, the system determines whether is likely to be contention or queuing for multiple trucks at a station, and if so, refueling missions at that station are moved up in time for one or more of the trucks. The overall schedule is altered to reflect those changes, and the revised schedule is pushed out to the fleet. For trucks with refueling events occurring within the first time (e.g., up to two hours), or for trucks predicted to run out of fuel within the first time, the system may model fuel consumption for the truck by implementing the method described above in reference to FIGS. 1-2. From this modeling, the system may determine an expected time at which the trucks are due to run out of fuel. The system may then reschedule or reallocate refueling missions occurring within the first time for those trucks. This may involve one or both of moving scheduled refueling missions up in time and reassigning a truck to a different-then-scheduled station. When refueling missions within the first time are reallocated, the system seeks to optimize on, at least, keeping the trucks from refueling as long as possible before running out of fuel, selecting stations that are as close as possible to the mission path, and avoiding contention/congestion at stations. These three considerations may be weighted in various ways.

Thus far has been discussed a system and a method for modeling mine operations, and potential use of that model for optimizing parameters. Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A method for mine configuration optimization, comprising:

receiving a plurality of vehicle models each model reflecting performance characteristics of a vehicles, the plurality of vehicle models including at least one battery electric vehicle;

receiving a geographical model of a mine layout, the geographical model including data representing a road network, one or more electrical trolley lines and a plurality of vehicle destination points;

receiving a plurality of vehicle movement rules governing the movement of vehicles within a mine;

in a mine operation model using a plurality of mine configuration parameters, iteratively performing the steps of:

simulating movement of a plurality modeled vehicles using the geographical model of the mine, in accordance with the vehicle movement rules, each of the plurality of modeled vehicles being reflected in the plurality of vehicle models;

on the basis of the simulated movement, computing a mine output parameter, altering a mine configuration parameter; and altering a physical mine configuration on the basis of one or more computations of the mine output parameter, wherein altering a physical mine configuration on the basis of one or more computations of the mine output parameter comprises changing a proportion of diesel-electric to battery electric vehicles operating in a mine and operating diesel-electric and battery electric vehicles in a mine in accordance with a changed proportion of diesel-electric to battery electric vehicles to transport mined material.

2. The method of claim 1, wherein, the plurality of vehicle models includes at least one diesel-electric vehicle, and wherein the battery electric vehicle and the at least one diesel-electric vehicle are mine haul trucks.

3. The method of claim 1, wherein the performance characteristics of the vehicles include one or more of battery capacity, fuel capacity, drive train efficiency, and regenerative braking efficiency.

4. The method of claim 1, wherein the performance characteristics of the vehicles comprise required energy input per unit energy output for a vehicle.

5. The method of claim 1, wherein the vehicle destination points include one or more of power shovels, crushers, dumps, maintenance bays, and refueling stations.

6. The method of claim 1, wherein the vehicle movement rules include one or more of dispatch rules, refueling rules, maintenance rules and contention rules.

7. The method of claim 6, wherein the vehicle movement rules include dispatch rules, and wherein the dispatch rules determine the next destination of a vehicle after it leaves a predetermined vehicle destination point.

8. The method of claim 6, wherein the vehicle movement rules include refueling rules, and wherein the refueling rules determine conditions under which a vehicle returns to a refueling or charging station.

9. The method of claim 6, wherein the vehicle movement rules include contention rules, and wherein the contention rules determine priority between two or more vehicles on a trajectory to occupy the same space.

10. The method of claim 1, wherein the mine configuration parameters comprise one of the proportion of diesel to battery-electric trucks within the plurality of modeled vehicles in the mine or the location of electrical trolley lines within the geographical model.

11. The method of claim 1, wherein the geographical model including data representing a road network includes data representing the road network in terms of road segment endpoints, elevation change over road segments and average grade.

12. The method of claim 1, wherein the mine output parameter comprises a product of tons of material moved and distance over which material is moved.

13. The method of claim 1, wherein computing a mine output parameter comprises computing a combination of two or more sub-parameters.

14. The method of claim 13, wherein the sub-parameters comprise a measure of an amount of material moved and vehicular carbon emissions.

15. The method of claim 1, wherein altering a physical mine configuration on the basis of one or more computations of the mine output parameter comprises installing electrical trolley lines on a mine road segment.

* * * * *